US008604972B2

(12) United States Patent
Miyake et al.

(10) Patent No.: US 8,604,972 B2
(45) Date of Patent: Dec. 10, 2013

(54) POSITION MEASURING DEVICE AND POSITION MEASURING METHOD BY MEANS OF GPS

(75) Inventors: Toshihide Miyake, Osaka (JP);
Haruhiko Yoshida, Osaka (JP);
Tomohiro Abe, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 406 days.

(21) Appl. No.: 13/061,717

(22) PCT Filed: Jul. 30, 2009

(86) PCT No.: PCT/JP2009/003604
§ 371 (c)(1),
(2), (4) Date: Mar. 2, 2011

(87) PCT Pub. No.: WO2010/035384
PCT Pub. Date: Apr. 1, 2010

(65) Prior Publication Data
US 2011/0205109 A1    Aug. 25, 2011

(30) Foreign Application Priority Data

Sep. 25, 2008  (JP) .................................. 2008-245056

(51) Int. Cl.
*G01S 19/43*    (2010.01)
*G01S 19/44*    (2010.01)

(52) U.S. Cl.
CPC . *G01S 19/43* (2013.01); *G01S 19/44* (2013.01)
USPC ................................ 342/357.26; 342/357.27

(58) Field of Classification Search
CPC ......... G01S 19/44; G01S 19/51; G01S 19/20; G01S 19/426
USPC .............. 342/357.26, 357.27, 357.34, 357.58
See application file for complete search history.

(56) References Cited

U.S. PATENT DOCUMENTS

| 5,202,829 | A | * | 4/1993 | Geier ............................ 701/470 |
| 5,914,685 | A | * | 6/1999 | Kozlov et al. ............ 342/357.26 |
| 7,148,843 | B2 | * | 12/2006 | Han et al. ................. 342/357.59 |

(Continued)

FOREIGN PATENT DOCUMENTS

| JP | 09-189753 | 7/1997 | ................ G01S 5/02 |
| JP | 10-246764 | 9/1998 | ................ G01S 5/10 |

(Continued)

OTHER PUBLICATIONS

Wu, Shuwu et al, "Geometry Extra-Redundant Almost Fixed Solutions: A High Integrity Approach for Carrier Phase Ambiguity Resolution for High Accuracy Relative Navigation," IEEE/ION Plans 2008. May 6-8, 2008, pp. 568-582.*
Int'l Search Report from corresponding Int'l Patent Application No. PCT/JP2009/003604.

*Primary Examiner* — Gregory C Issing
(74) *Attorney, Agent, or Firm* — Kusner & Jaffe

(57) ABSTRACT

In a position measuring method, GPS ranging data obtained at a reference station 1 and an observation station 2 is inputted to four solution calculating sections 12, RTK solutions such as a fix solution at the observation station 2 are calculated in the solution calculating sections 12 according to the RTK system, and the RTK solutions are inputted to a solution obtaining unit 13. Further, it is decided whether or not the RTK solutions include multiple fix solutions. When it is decided that the RTK solutions include multiple fix solutions, deviations between the fix solutions are determined and it is decided whether or not the deviations exceed an allowable value. When it is decided that none of the deviations exceed the allowable value, predetermined arithmetic processing is performed on the fix solutions to obtain a normal fix solution. Moreover, the solution calculating sections are sequentially restarted at predetermined time intervals.

8 Claims, 8 Drawing Sheets

(56) References Cited

U.S. PATENT DOCUMENTS

| | | | |
|---|---|---|---|
| 7,450,061 B2 * | 11/2008 | Terada et al. | 342/357.27 |
| 2004/0212533 A1 * | 10/2004 | Whitehead et al. | 342/357.08 |
| 2009/0326736 A1 * | 12/2009 | Waid | 701/3 |
| 2010/0225532 A1 * | 9/2010 | France et al. | 342/357.23 |
| 2011/0267226 A1 * | 11/2011 | Talbot et al. | 342/357.27 |

FOREIGN PATENT DOCUMENTS

| | | | |
|---|---|---|---|
| JP | 2006-300602 | 11/2006 | G01S 5/14 |
| JP | 2008-002975 | 1/2008 | G01S 5/14 |

* cited by examiner

POSITION MEASURING DEVICE AND POSITION MEASURING METHOD BY MEANS OF GPS

TECHNICAL FIELD

The present invention relates to a position measuring device and a position measuring method by means of GPS.

BACKGROUND ART

The RTK (Real Time kinematic) system is a positioning method for determining the three-dimensional position of a measurement object (hereinafter, will be called a measuring point) in real time by means of GPS (Global Positioning System). The RTK system is also used for tsunami/ocean wave observation using marine research buoys.

In the RTK system, a carrier phase at a measuring point is measured with reference to the measured value of a carrier phase at a reference point from a GPS satellite. The latitude, longitude, and height of the reference point have been determined beforehand. Further, a baseline vector is determined when the measuring point is viewed from the reference point, and the three-dimensional position of the measuring point is precisely measured. In the RTK system, an integer bias for the measured value of the carrier phase is determined, achieving high-precision positioning.

However, for example, when sea level positions, that is, sea level displacements are successively measured in the RTK system, an integer bias may be erroneously determined because of the influence of the ionosphere and the troposphere or factors such as a cycle slip of a GPS receiver, resulting in a jumping phenomenon of rapidly changing GPS ranging data (data corresponding to a distance between a GPS satellite and a receiver). This phenomenon may reduce the reliability of the GPS ranging data and cause a false warning in, e.g., tsunami observation.

In order to solve this problem, a technique is currently available for the identification of GPS positioning data (three-dimensional position data computed based on a GPS satellite position and GPS ranging data) erroneously recognized by a jumping phenomenon, based on information about whether a current solution is a fix solution or a less accurate solution (e.g., see Japanese Patent Laid-Open No. 2008-2975).

CITATION LIST

Patent Literature

Patent Literature 1: Japanese Patent Laid-Open No. 2008-2975

DISCLOSURE OF THE INVENTION

Technical Problem

In the RTK system, an integer bias is unchanged until the acquisition of a GPS satellite is interrupted at a GPS receiver. In other words, in the algorithm of the RTK system, once an integer bias is determined, the integer bias typically remains fixed and is not recalculated. Thus if a jumping phenomenon occurs on the integer bias in long and continuous positioning, incorrect GPS ranging data is outputted for a long time.

Therefore, in the configuration disclosed in Japanese Patent Laid-Open No. 2008-2975, erroneously recognized positioning data can be surely identified based on an obtained solution. However, if a jumping phenomenon occurs on an integer bias and a fix solution has an abnormal value, the erroneously recognized data cannot be identified.

An object of the present invention is to provide a position measuring device and a position measuring method by mean of GPS which can remove a fix solution having an abnormal value in the RTK system.

Solution to Problem

In order to attain the object, a position measuring device by means of GPS according to the present invention is a device for measuring a three-dimensional position of a moving object based on GPS ranging data obtained at a reference station that is a reference GPS receiver installed on the ground and GPS ranging data obtained at an observation station that is an observation GPS receiver disposed on the moving object to be located, the position measuring device including multiple solution calculating sections that receive the GPS ranging data from the reference station and the GPS ranging data from the observation station and are capable of calculating RTK solutions such as a fix solution and a float solution as position data of the observation station according to the real time kinematic (RTK) system, the solution calculating sections being sequentially restarted at predetermined time intervals, the position measuring device further including a solution obtaining unit for receiving the RTK solutions outputted from the solution calculating sections and obtaining a normal fix solution;

the solution obtaining unit including:

a number decision section for deciding whether or not the inputted RTK solutions include multiple fix solutions;

a deviation calculating section for determining, when the number decision section decides that the RTK solutions include multiple fix solutions, deviations between the fix solutions; and an allowable value decision section for deciding whether or not the deviations calculated by the deviation calculating section exceed an allowable value, wherein when the allowable value decision section decides that none of the deviations exceed the allowable value, a normal fix solution is obtained based on the fix solutions.

Further, in the position measuring device, the observation station is installed on an observation buoy moored in a predetermined sea area and the position data is calculated as a sea-level position.

A position measuring method by means of GPS according to the present invention includes: inputting, to multiple solution calculating sections, GPS ranging data obtained at a reference station that is a reference GPS receiver installed on the ground and GPS ranging data obtained at an observation station that is an observation GPS receiver disposed on a moving object to be located;

calculating RTK solutions such as a fix solution and a float solution as position data of the observation station according to the real time kinematic (RTK) system in the respective solution calculating sections;

deciding whether or not the obtained RTK solutions include multiple fix solutions;

determining, when it is decided that the RTK solutions include multiple fix solutions, deviations between the fix solutions;

deciding whether or not the determined deviations exceed an allowable value; and obtaining a normal fix solution based on the fix solutions when it is decided that none of the deviations exceed the allowable value, wherein the solution calculating sections are sequentially restarted at predetermined time intervals.

In the position measuring method, the observation station is installed on an observation buoy moored in a predetermined sea area and the position data is calculated as a sea-level position.

Advantageous Effects of Invention

According to the position measuring device and the position measuring method, the solution calculating sections using the RTK system are provided and the deviations between the fix solutions obtained in the solution calculating sections are compared with the allowable value. When none of the deviations exceed the allowable value, a normal fix solution is obtained based on the fix solutions. Thus it is possible to substantially always obtain a normal fix solution. In other words, fix solutions having abnormal values can be removed with higher reliability.

Further, the solution calculating sections are sequentially restarted at the predetermined time intervals. Thus even if a fix solution has an abnormal value, an integer bias determined in the solution calculating section having the abnormal value is returned to a normal value within a predetermined time, so that a normal fix solution can be obtained.

Thus unlike in the related art, it is possible to prevent continuous output of false position data when a fix solution has an abnormal value. Therefore, the position measuring device and the position measuring method make it possible to detect a tsunami or the like with high accuracy, thereby preventing issuing of a false tsunami warning.

DESCRIPTION OF EMBODIMENTS

Referring to FIGS. 1 to 6, the following will describe a position measuring device and a position measuring method by means of GPS according to an embodiment of the present invention.

The position measuring device and the position measuring method are used for precisely measuring the position of a moving object, to be specific, a sea-level position by means of GPS (Global Positioning System). The measuring method uses the real-time kinematic [hereinafter, will be called RTK (Real Time Kinematic)] system, that is, the differential positioning system (also called the interferometric positioning system) using a carrier phase.

The present embodiment will describe a sea-level position measuring device using the position measuring device. The position measuring method will be described as a principle part of a sea-level position measuring method.

Figure 1:
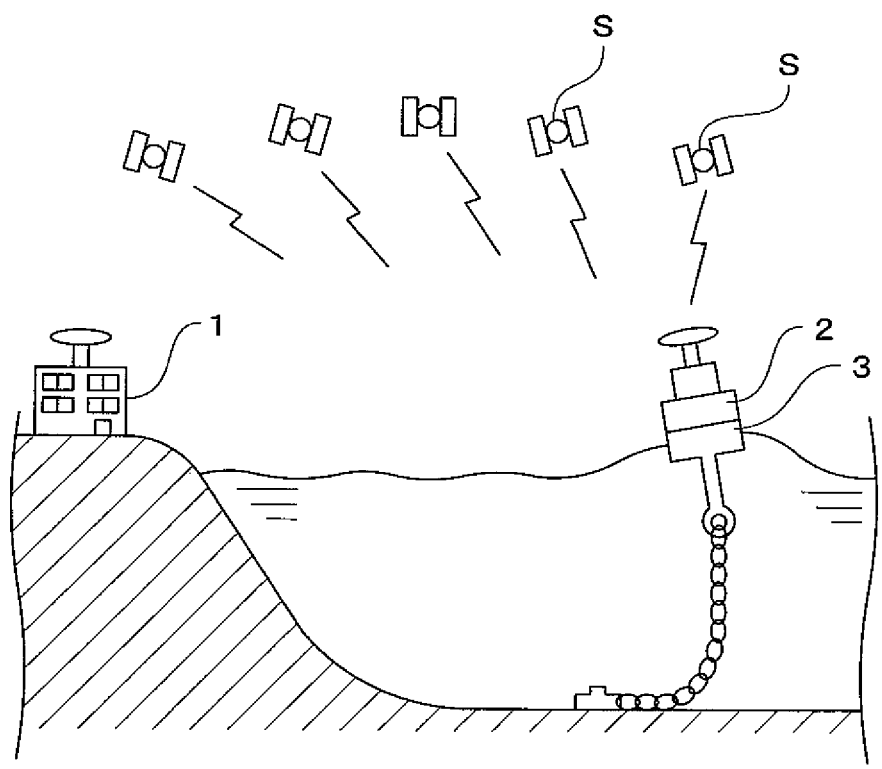
FIG. 1 is a schematic overall structural diagram showing the installation environment of a sea-level position measuring device for measuring a sea-level position by using a position measuring device according to an embodiment of the present invention.

Referring to FIG. 1, the following will first describe the schematic configuration of the sea-level position measuring device including the position measuring device.

The sea-level position measuring device uses the RTK system. As shown in FIG. 1, the RTK system is used for measuring a sea-level position in a predetermined sea area based on GPS ranging data obtained at a reference GPS receiver (hereinafter, will be called a reference station) 1 on the ground and an observation GPS receiver (hereinafter, will be called an observation station) 2, the observation station 2 being installed on an observation buoy (an example of a moving object to be located) 3 moored in the predetermined sea area.

Figure 2:
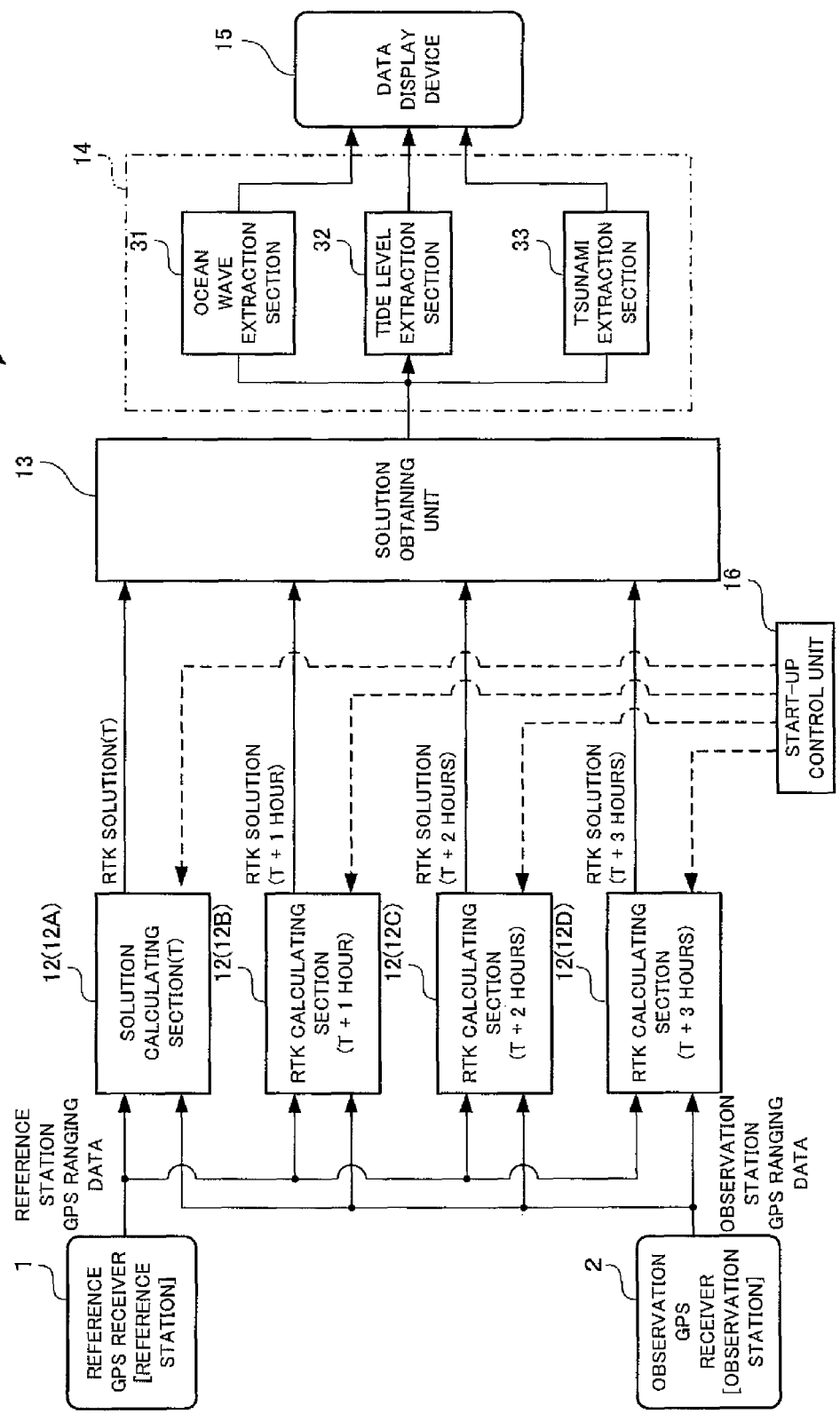
FIG. 2 is a block diagram schematically showing the configuration of the sea-level position measuring device using the position measuring device.

As shown in FIG. 2, a sea-level position measuring device 11 includes: multiple, e.g., four solution calculating sections (also called RTK calculating sections) 12 (12A to 12D) that receive GPS ranging data from the reference station 1 and GPS ranging data from the observation station 2 and obtain sea-level position data (three-dimensional position data, also called positioning data) of the observation station 2 by the RTK system; a solution obtaining unit 13 that receives RTK solutions outputted from the solution calculating sections 12, performs predetermined arithmetic processing on the RTK solutions to obtain a normal fix solution, and outputs the fix solution; a data analyzing unit 14 that receives the fix solution, that is, the sea-level position data from the solution obtaining unit 13 and analyzes a sea-level displacement to extract ocean wave/tide level/tsunami components; and a data display device (specifically, may be a monitor or a printer) 15 for displaying the data extracted by the data analyzing unit 14 on, e.g., a screen. The solution calculating sections 12 are sequentially started and restarted at predetermined time intervals, e.g., every one hour. Further, a start-up control unit 16 is provided that sequentially starts and restarts (may be called initialization or reset) the solution calculating sections 12. At the restart, a driving power source is not turned off, initial values for internal arithmetic processing are reset, and arithmetic values for the subsequent arithmetic processing are also reset (e.g. to zero). As a matter of course, the solution calculating sections 12 may be turned on again.

Figure 3:
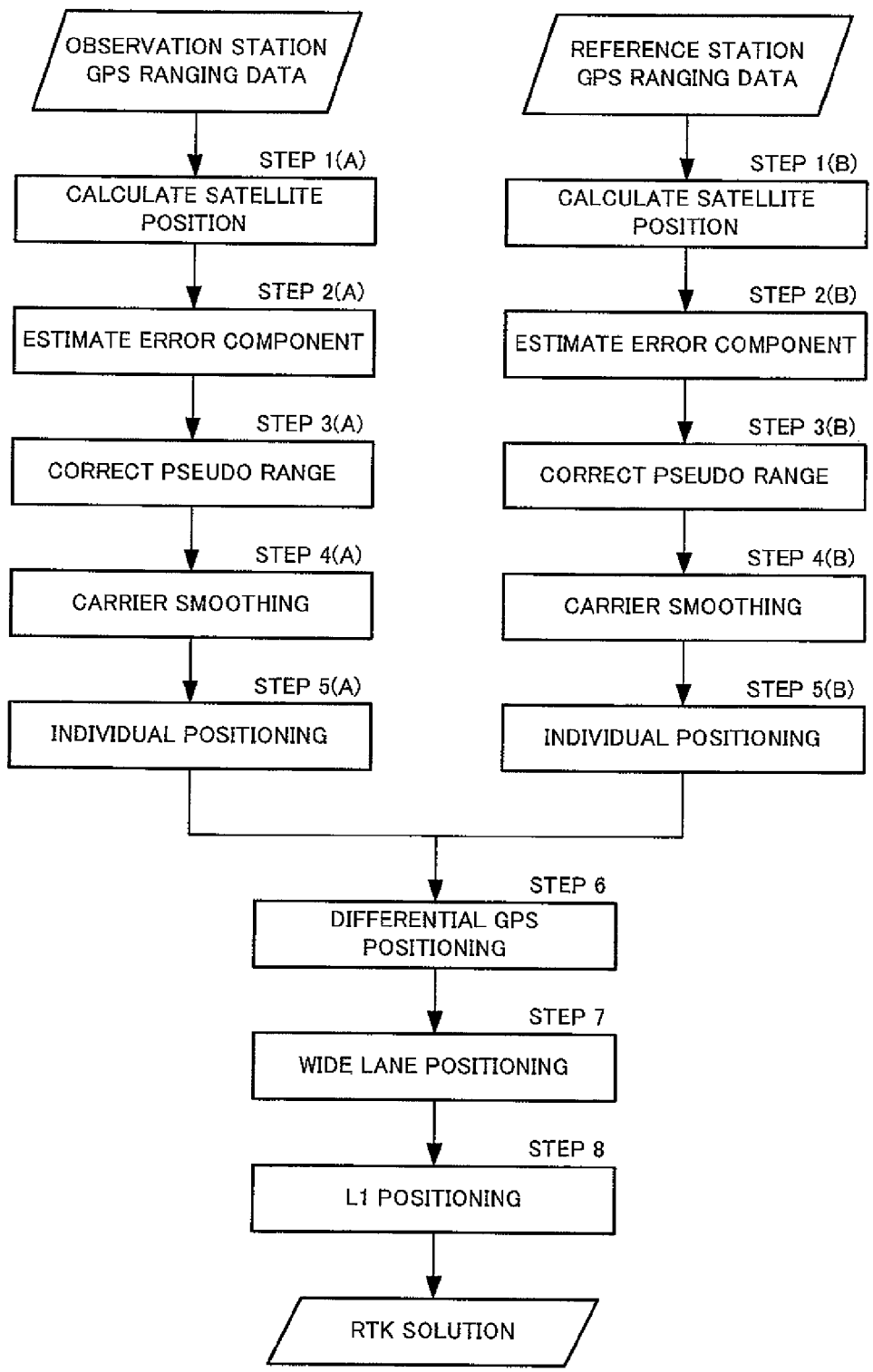
FIG. 3 is a flowchart for explaining the RTK system used for the sea-level position measuring device.

Referring to the flowchart of FIG. 3, the RTK system, that is, calculating steps in the solution calculating sections 12 will be schematically described below.

When radio waves from the GPS satellites S are obtained at the observation station (hereinafter, will be called a receiver) 2 and are inputted to the solution calculating sections 12, first, the positions of the acquired GPS satellites S and pseudo ranges [radio wave arrival time from the satellite to the receiver x ray velocity (light velocity)] to the GPS satellites S are calculated [step 1(1A)].

Next, an error caused by the influence of the ionosphere and the troposphere and a clock error of the receiver are estimated [step 2(2A)].

Subsequently, the pseudo ranges to the GPS satellites S are corrected by using the estimated error and the estimated clock error of step 2(2A) [step 3(3A)].

Next, the pseudo ranges determined in step 3(3A) are smoothed according to equation (1) [step 4(4A)]. The smoothing is performed to reduce the influence of large observation noise of the pseudo ranges by using a carrier phase having less observation noise.

[Expression 1]

$$\tilde{\rho}_{L1}(k) = \frac{M-1}{M}\left[\tilde{\rho}_{L1}(k-1) + \lambda_{L1} \cdot \Delta\phi_{L1}(k)\right] + \frac{1}{M} \cdot \rho_{L1}(k) \qquad (1)$$

where $\rho_{L1}(k)$ is L1 pseudo range [m] (row value) at epoch (operation period) k; $\phi_{L1}(k)$ is L1 carrier phase [cycle] at epoch k; $\tilde{\rho}_{L1}(k)$ is smoothed L1 pseudo range [m] at epoch k; $\lambda_{L1}$ is L1 wavelength [m] ... a constant value; and M is a smoothing constant.

$$\Delta\phi_{L1}(k)=\phi_{L1}(k)-\phi_{L1}(k-1)$$

Subsequently, individual positioning is performed using the pseudo range determined in step 4(4A) [step 5(5A)].

The steps 1(1A) to 5(5A) are simultaneously performed also on the reference station 2 [steps 1(1B) to steps 5(5B)].

Next, based on the pseudo range determined at the reference station 1 and a position having been accurately determined in the reference station 1, an error superimposed on the pseudo range is determined and the error is subtracted from the pseudo range determined at the observation station 2 to obtain a correct distance, that is, a D-GPS solution (differential GPS positioning) (step 6).

Subsequently, according to equation (2), integer biases are determined in a wide lane by using two frequency signals (L1, L2) emitted from the GPS satellite S.

[Expression 2]

$$\lambda_W \cdot \phi_W = \frac{c}{f_{L1} - f_{L2}}(\phi_{L1} - \phi_{L2}) \qquad (2)$$

where $\lambda_W$ is the wavelength of the wide lane (=86.2 cm) [m]; $\phi_W$ is the carrier phase of the wide lane [cycle]; $f_{L1}$, $f_{L2}$ are L1 and L2 frequencies [Hz]; $\phi_{L1}$, $\phi_{L2}$ are L1 and L2 carrier phases [cycle]; and c is a light velocity [m/s].

A carrier at L1 has a wavelength of 19.0 cm and a carrier at L2 has a wavelength of 24.4 cm, whereas the wide lane has quite a long wavelength of 86.2 cm and thus integer bias candidates can be easily narrowed down. Therefore, integer biases are narrowed down at L1 after integer biases are determined in the wide lane.

After the integer biases are determined in the wide lane, an operation can be performed for positioning in the wide lane (wide lane positioning) (step 7).

Next, an integer bias at L1 is determined based on the integer biases in the wide lane. After the determination of the integer bias at L1, an operation for positioning at L1 can be performed (L1 positioning) (step 8).

Through these steps, RTK solutions can be obtained.

Figure 4:
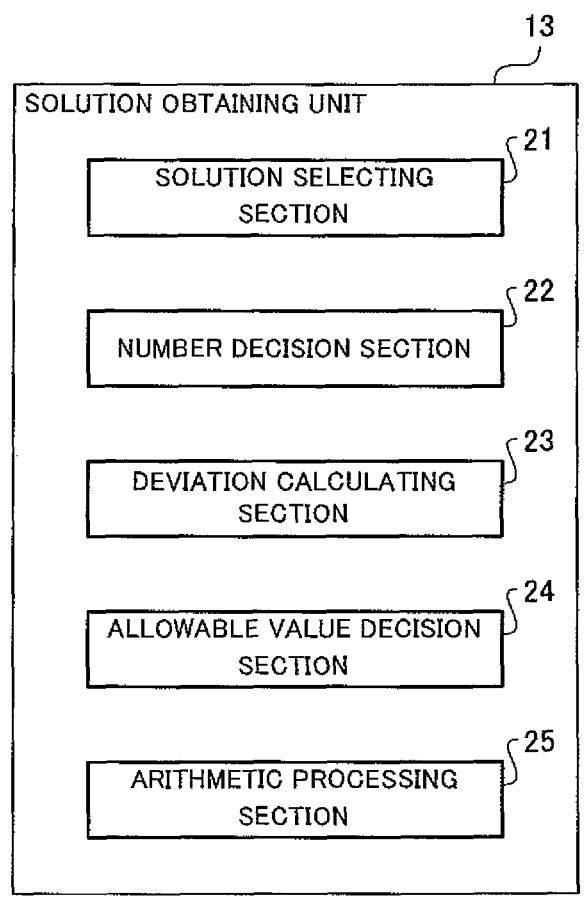
FIG. 4 is a block diagram schematically showing the configuration of a solution obtaining unit of the sea-level position measuring device.

As shown in FIG. 4, the solution obtaining unit 13 includes: a solution selecting section 21 that receives the RTK solutions from the solution calculating sections 12 and selects at least one fix solution; a number decision section 22 that decides whether or not multiple fix solutions have been selected by the solution selecting section 21; a deviation calculating section 23 that determines deviations (may be simply called "differences") between the fix solutions when the number decision section 22 decides that the multiple fix solutions have been selected; an allowable value decision section 24 that decides whether or not all deviations calculated by the deviation calculating section 23 exceed an allowable value (threshold value); and an arithmetic processing section 25 that performs predetermined arithmetic processing on the fix solutions to obtain a normal (proper or optimum) fix solution when the allowable value decision section 24 decides that the deviations do not exceed the allowable value.

In the arithmetic processing section 25, for example, the average of the fix solutions is determined and the average fix solution is outputted as a normal fix solution from the solution obtaining unit 13. Instead of the average, the median may be used (in the case of even-numbered pieces of data, the average of two pieces at the center is used).

The data analyzing unit 14 includes an ocean wave extraction section 31 that receives the fix solution obtained in the solution obtaining unit 13, that is, sea-level position data and extracts an ocean wave; a tide level extraction section 32 that extracts a tide level; and a tsunami extraction section 33 that extracts a tsunami.

In the ocean wave extraction section 31, the sea-level position data undergoes high-pass filter (e.g., an FIR filter) processing and only ocean wave components are extracted that are short-period components.

In the tide level extraction section 32, the sea-level position data undergoes low-pass filter processing, short-period components such as ocean wave components are removed, and a tide level is extracted that is a long-period component (tsunami components are left). In this case, a FIR low-pass filter is used (the calculation method corresponds to a weighted moving average) and the short-period components can be removed without deforming a waveform.

The tsunami extraction section 33 includes: a measured tide level detection section that performs FIR low-pass filter processing on the sea-level position data and removes short-period components such as ocean wave components to obtain an actual tide level (hereinafter, will be called a measured tide level); a tide level estimating section that estimates a tide level by using a tide level estimation formula; and a tsunami detection section that receives the measured tide level obtained by the measured tide level detection section and the estimated tide level obtained by the tide level estimating section and detects a tsunami by subtracting the estimated tide level from the measured tide level. In other words, tsunami components having longer periods than ocean waves can be extracted by subtracting the estimated tide level from the measured tide level.

Figure 5:
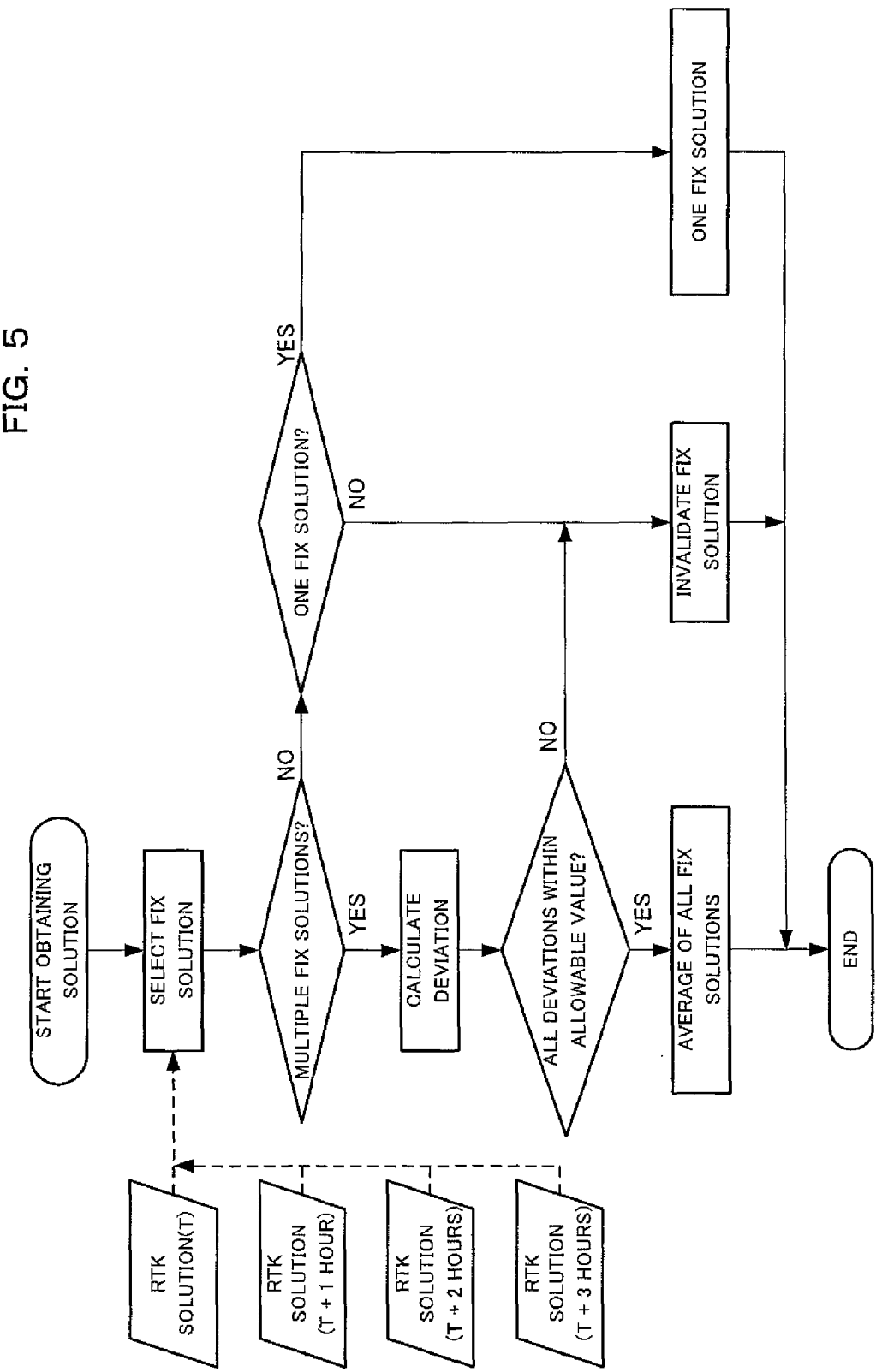
FIG. 5 is a flowchart showing the steps of measuring a sea-level position by the sea-level position measuring device.

Referring to the flowchart of FIG. 5, the following will describe a sea-level position measuring method including the step of obtaining a normal fix solution by the sea-level position measuring device 11.

Figure 6:
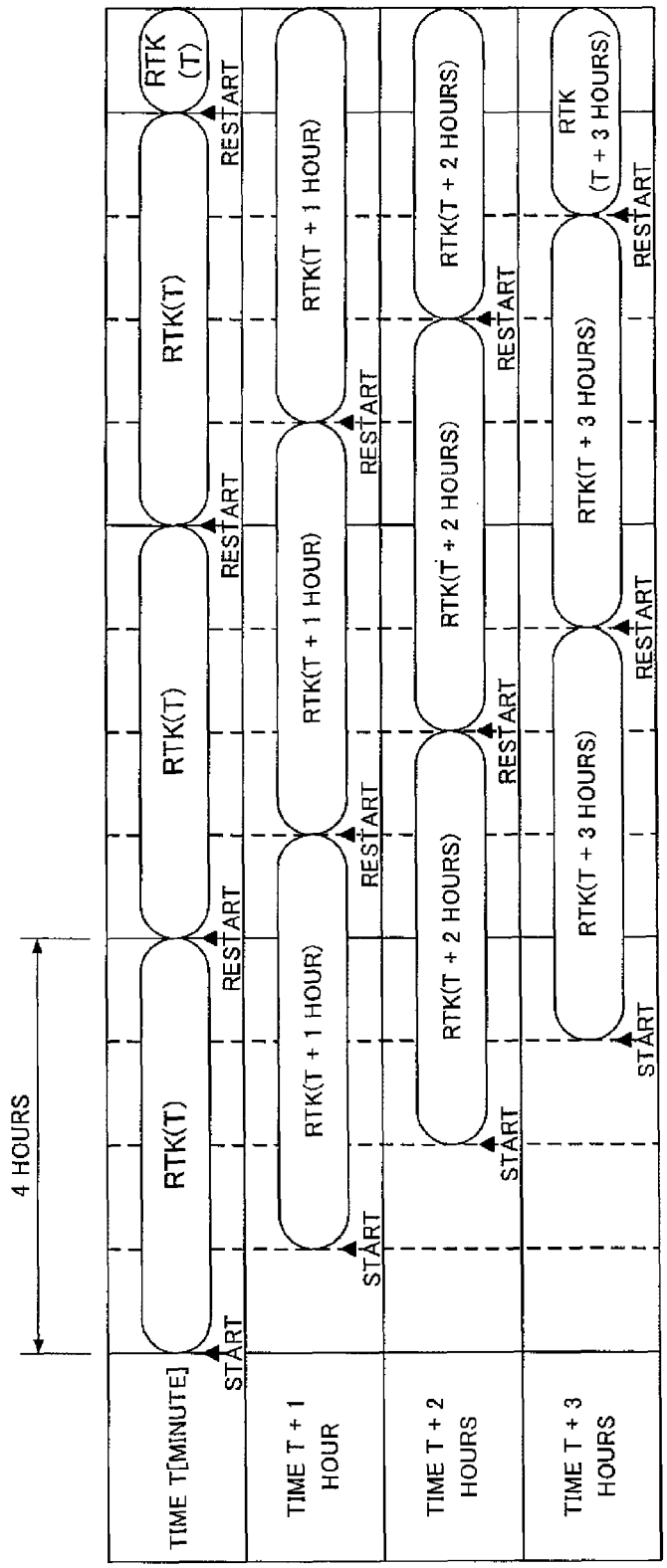
FIG. 6 shows a start/restart schedule of solution calculating sections in the sea-level position measuring device.

As has been discussed, the sea-level position measuring device 11 includes the four solution calculating sections 12 that are started and restarted by the start-up control unit 16 at the predetermined time intervals, e.g., every one hour. FIG. 6 shows a start/restart schedule. "T" in FIG. 6 represents the starting time of the firstly started solution calculating section 12. "T+1 hour", "T+2 hours", and "T+3 hours" represent the starting times of the secondly, thirdly, and fourthly started solution calculating sections 12.

In other words, as shown in FIG. 5, the GPS ranging data obtained at the reference station 1 and the observation station 2 is inputted to the solution calculating sections 12, and a fix solution (FIX solution) is precisely determined by the RTK system. As a matter of course, in addition to the fix solution, solutions such as a float solution, a D-GPS solution, and an individual positioning solution are determined with lower precision than the fix solution.

Further, the RTK solutions such as a fix solution, float solution, a D-GPS solution, and an individual positioning solution from the solution calculating sections 12 are inputted to the solution selecting section 21 of the solution obtaining unit 14, and then at least one fix solution is selected.

Next, the fix solution selected by the solution selecting section 21 is inputted to the number decision section 22, and then the number of fix solutions is determined.

When the number decision section 22 decides that multiple fix solutions have been selected, the fix solutions are inputted to the deviation calculating section 23 and deviations between the fix solutions are determined.

Next, the deviations are inputted to the allowable value decision section 24, the absolute values of the deviations and a preset value are compared with each other, and then it is decided whether or not all the deviations exceed the allowable value.

When the allowable value decision section 24 decides that none of the deviations exceed the allowable value, it is decided that all the fix solutions have normal values. Then, the fix solutions are inputted to the arithmetic processing section 25 and the average value of all the fix solutions is calculated. The average value is outputted as sea-level position data.

When the number decision section 22 decides that only one fix solution has been selected, the fix solution is outputted from the solution obtaining unit 13.

When the allowable value decision section 24 decides that the deviations do not all exceed the allowable value, that is, when any one of the deviations exceeds the allowable value, a jumping phenomenon occurs on integer biases and it is decided that the fix solutions have abnormal values. Thus the fix solutions obtained this time are all invalidated.

The normal fix solution obtained thus is transmitted to the data analyzing unit 14 as sea-level position data. Then, the fix solution is analyzed into an ocean wave, a tide, a tsunami, and so on, and then the fix solution is transmitted to the data display device 15 and displayed on, e.g., a screen.

When the solution calculating sections 12 are restarted, pseudo ranges and carrier phases measured in the past are used in, e.g., smoothing and thus the pseudo ranges and carrier phases are initialized.

According to the sea-level position measuring device and the sea-level position measuring method, the multiple solution calculating sections 12 using the RTK system are provided and deviations between the fix solutions obtained in the solution calculating sections 12 are compared with the allowable value. When none of the deviations exceeds the allowable value, a normal fix solution is obtained based on these fix solutions. Thus a normal fix solution can be substantially always obtained. In other words, fix solutions having abnormal values can be more reliably removed.

Further, the solution calculating sections 12 are sequentially restarted at the predetermined time intervals. Thus even if a fix solution has an abnormal value, an integer bias returns to normal within a predetermined time in the solution calculating section 12 where the abnormal value has occurred, so that a normal fix solution is obtained.

Thus unlike in the related art, even if a fix solution has an abnormal value, it is possible to prevent continuous output of false position data. Therefore, the sea-level position measuring device and the sea-level position measuring method make it possible to detect a tsunami or the like with high accuracy, thereby preventing issuing of a false tsunami warning.

In the foregoing explanation, the position measuring device was described as the principle part of the sea-level position measuring device. The position measuring device is made up of, e.g., the solution calculating sections 12 and the solution obtaining unit 13.

The foregoing embodiment described the sea-level position measuring device including the four solution calculating sections sequentially restarted at the predetermined time intervals, and the sea-level position measuring method. The following will simply describe a sea-level position measuring device and a sea-level position measuring method as a reference example achieving the same effect.

The sea-level position measuring device includes two solution calculating sections, one of which acts as a main solution calculating section (main) and the other of which acts as a sub solution calculating section (sub). The sub solution calculating section is restarted at predetermined time intervals, and the main solution calculating section is restarted only at the time when a deviation between fix solutions obtained in the solution calculating sections exceeds an allowable value.

Figure 7:
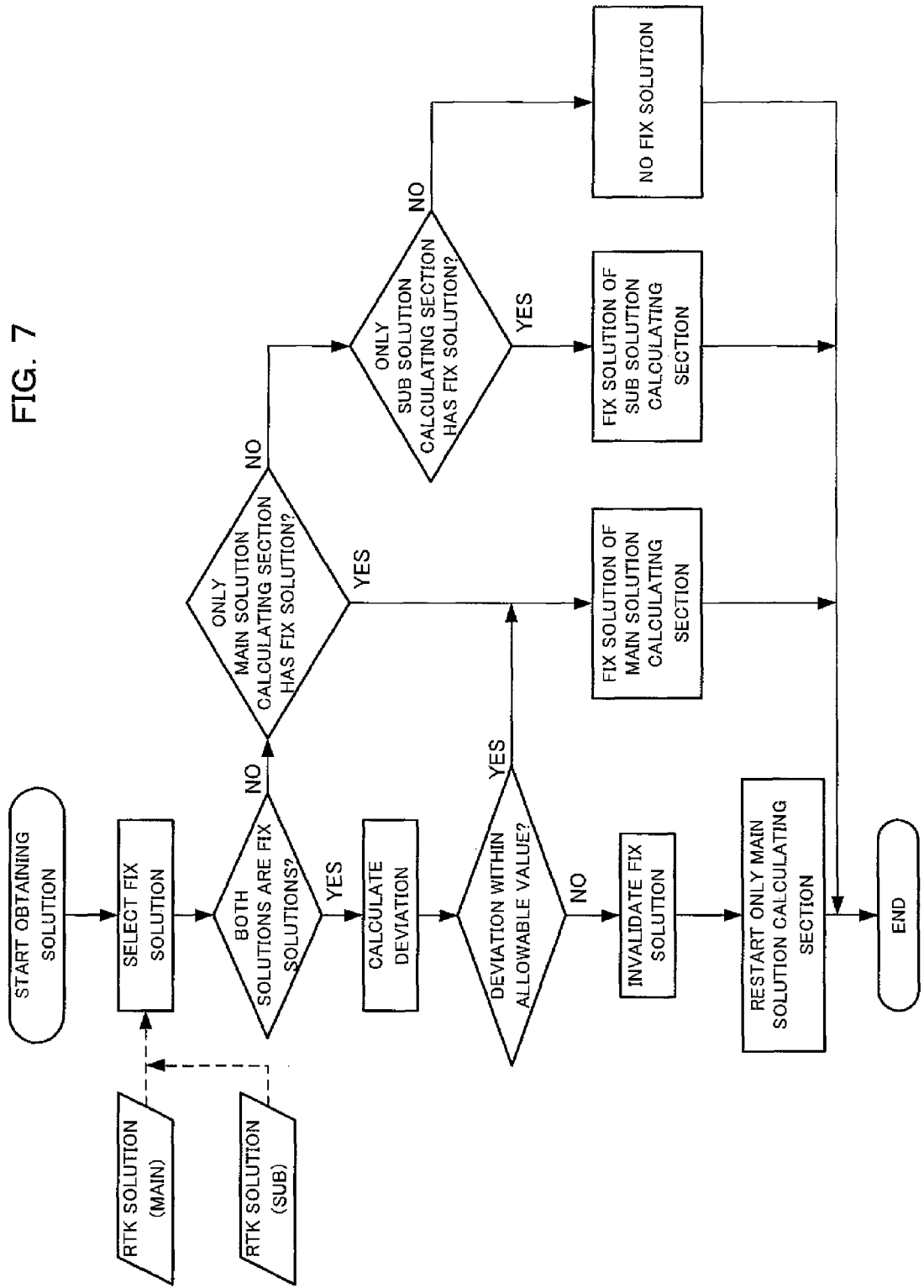
FIG. 7 is a block diagram schematically showing the configuration of a reference example of the sea-level position measuring device according to the present invention.

Referring to the flowchart of FIG. 7, the sea-level position measuring method will be simply described below.

Specifically, RTK solutions determined in the two solution calculating sections are inputted to the solution selecting section of a solution obtaining unit, and at least one fix solution is selected from the RTK solutions. After that, in a solution decision section (corresponding to the number decision section of the foregoing embodiment), it is decided whether the RTK solutions are both fix solutions or not. In the case where only one of the RTK solutions is a fix solution, it is decided which of the solution calculating sections has outputted the fix solution.

When it is decided that the RTK solutions are both fix solutions, a deviation between the fix solutions is determined and then the deviation is compared with the predetermined allowable value to decide whether the deviation exceeds the allowable value or not.

When it is decided that the deviation does not exceed the allowable value, the fix solution from the main solution calculating section is obtained as a normal fix solution. When the deviation exceeds the allowable value, the fix solutions are both invalidated and only the main solution calculating section is restarted.

When the solution decision section decides that the RTK solutions are not fix solutions, it is first decided whether or not the solution from the main solution calculating section is a fix solution. When it is decided that the solution from the main solution calculating section is a fix solution, the fix solution is obtained as a normal fix solution.

Figure 8:
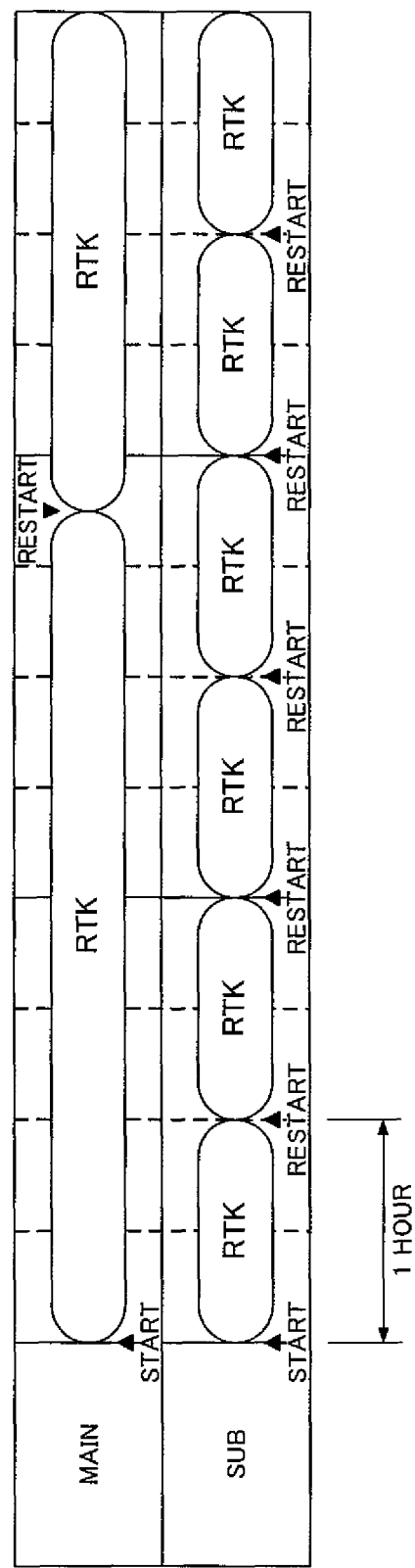
FIG. 8 is a start/restart schedule of solution calculating sections in the sea-level position measuring device according to the reference example.

Next, when the solution decision section decides that the solution from the main solution calculating section is not a fix solution, it is decided whether or not the solution from the sub solution calculating section is a fix solution. When it is decided that the solution from the sub solution calculating section is a fix solution, the fix solution is obtained as a normal fix solution. When it is decided that the solution is not a fix solution, the solutions from the main and sub solution calculating sections are not fix solutions. Thus the absence of fix solutions is decided. FIG. 8 shows a restart schedule of the solution calculating sections in this case.

The sea-level position measuring device and the sea-level position measuring method of the reference example can obtain the same effect as the foregoing embodiment.

In other words, as compared with the related art in which the single solution calculating section is provided, a normal fix solution can be more easily obtained. Thus fix solutions having abnormal values can be more reliably removed.

INDUSTRIAL APPLICABILITY

At least an observation GPS receiver of a position measuring device according to the present invention is installed on an observation buoy moored in a predetermined sea area, thereby accurately detecting a displacement of the sea level. Therefore, the position measuring device and the position measuring method of the present invention are most suitable for detecting, e.g., a tsunami.

The invention claimed is:

1. A position measuring device by means of GPS, the device measuring a three-dimensional position of a moving object based on GPS ranging data obtained at a reference station that is a reference GPS receiver installed on ground and GPS ranging data obtained at an observation station that is an observation GPS receiver disposed on the moving object to be located, the position measuring device comprising multiple solution calculating sections that receive the GPS ranging data from the reference station and the GPS ranging data from the observation station and calculate RTK solutions, including a fixed solution and a float solution, as position data of the observation station according to a real time kinematic (RTK) technique, the solution calculating sections being sequentially restarted at predetermined time intervals, the position measuring device further comprising a solution obtaining unit for receiving the RTK solutions outputted from said solution calculating sections and obtaining an optimum fixed solution;

the solution obtaining unit comprising:
  a number decision section for deciding whether or not the inputted RTK solutions include multiple fixed solutions;
  a deviation calculating section for determining, when the number decision section decides that the RTK solutions include multiple fixed solutions, deviations between the fixed solutions; and
  an allowable value decision section for deciding whether or not the deviations calculated by the deviation calculating section exceed an allowable value,
  wherein when the allowable value decision section decides that none of the deviations exceed the allowable value, said optimum fixed solution is obtained based on the fixed solutions,
  when said number decision section decides that the number of fixed solutions is one, the fixed solution is outputted from the solution obtaining unit; and
  when all of the deviations exceed the allowable value in the allowable value decision section, all of the obtained fixed solutions are cancelled.

2. The position measuring device by means of GPS according to claim 1, wherein the observation station is installed on an observation buoy moored in a predetermined sea area and the position data is calculated as a sea-level position.

3. A position measuring method by means of GPS, comprising:
  inputting, to multiple solution calculating sections, GPS ranging data obtained at a reference station that is a reference GPS receiver installed on ground and GPS ranging data obtained at an observation station that is an observation GPS receiver disposed on a moving object to be located;
  calculating RTK solutions, including a fixed solution and a float solution, as position data of the observation station according to a real time kinematic (RTK) technique in the respective solution calculating sections, the solution calculating sections being sequentially restarted at predetermined time intervals;
  deciding whether or not the obtained RTK solutions include multiple fixed solutions;
  determining, when it is decided that the RTK solutions include multiple fixed solutions, deviations between the fixed solutions;
  deciding whether or not the determined deviations exceed an allowable value;
  obtaining an optimum fixed solution based on the fixed solutions when it is decided that none of the deviations exceed the allowable value;
  outputting the fixed solution from a solution obtaining section when it is determined that the number of the fixed solutions is one; and
  cancelling all the obtained fixed solutions when it is decided that all of the deviations exceed the allowable value.

4. The position measuring method by means of GPS according to claim 3, wherein the observation station is installed on an observation buoy moored in a predetermined sea area and the position data is calculated as a sea-level position.

5. The position measuring method by means of GPS according to claim 3, wherein said predetermined time interval is one hour.

6. The position measuring method by means of GPS according to claim 3, wherein initial values in said solution calculating sections are reset when said solution calculating sections are sequentially restarted.

7. The position measuring device by means of GPS according to claim 1, wherein said predetermined time interval is one hour.

8. The position measuring device by means of GPS according to claim 1, wherein initial values in said solution calculating sections are reset when said solution calculating sections are sequentially restarted.

* * * * *